US007620256B2

(12) United States Patent
Yokose (10) Patent No.: US 7,620,256 B2
(45) Date of Patent: Nov. 17, 2009

(54) METHOD AND APPARATUS FOR PROCESSING IMAGES IN A LAYERED STRUCTURE

(75) Inventor: Taro Yokose, Naki-machi (JP)

(73) Assignee: Fuji Xerox Corporation Co., Ltd., Tokyo (JP)

( * ) Notice: Subject to any disclaimer, the term of this patent is extended or adjusted under 35 U.S.C. 154(b) by 658 days.

(21) Appl. No.: 11/319,396

(22) Filed: Dec. 29, 2005

(65) Prior Publication Data

US 2007/0053596 A1    Mar. 8, 2007

(30) Foreign Application Priority Data

Sep. 2, 2005   (JP)   ............... 2005-254408

(51) Int. Cl.
G06K 9/36   (2006.01)
G06K 9/46   (2006.01)
(52) U.S. Cl. ..................... 382/239; 382/224
(58) Field of Classification Search ........... 382/162, 382/164, 166, 224, 232, 233, 238, 239, 240, 382/245, 282; 341/57, 63; 348/411.1; 358/426.13; 375/240.14, E7.202
See application file for complete search history.

(56) References Cited

U.S. PATENT DOCUMENTS

| 4,982,283 | A | * | 1/1991 | Acampora | ............. 375/240.12 |
| 5,929,912 | A | * | 7/1999 | Aono et al. | ............. 375/240.11 |
| 6,332,119 | B1 | * | 12/2001 | Hinderks | ................... 704/206 |
| 6,496,607 | B1 | * | 12/2002 | Krishnamurthy et al. | .... 382/282 |
| 6,580,754 | B1 | * | 6/2003 | Wan et al. | ............. 375/240.01 |
| 6,636,642 | B1 | | 10/2003 | Yokose | |
| 6,795,506 | B1 | * | 9/2004 | Zhang et al. | ........... 375/240.26 |
| 2003/0194138 | A1 | * | 10/2003 | Osawa et al. | ................ 382/233 |
| 2003/0198381 | A1 | | 10/2003 | Tanaka et al. | |
| 2004/0170335 | A1 | * | 9/2004 | Pearlman et al. | ............ 382/240 |
| 2006/0045361 | A1 | * | 3/2006 | Yokose | ........................ 382/232 |
| 2007/0053596 | A1 | * | 3/2007 | Yokose | ........................ 382/239 |
| 2007/0217531 | A1 | * | 9/2007 | Kwon et al. | ................ 375/260 |

\* cited by examiner

*Primary Examiner*—Amir Alavi
(74) *Attorney, Agent, or Firm*—Oliff & Berridge, PLC (57) ABSTRACT

An image processing apparatus includes an image element allocation unit that allocates image elements included in input image data to any of plural mutually-different coding processings, in accordance with a allocation reference, a coding unit that encodes, by the respective coding processings, the image elements allocated to the respective coding processings by the image element allocation unit, and a reference change unit that changes the allocation reference applied by the image element allocation unit.

13 Claims, 9 Drawing Sheets

APPLIED CODING PROCESSING
REVERSIBLE LAYER : PREDICTIVE CODING
IRREVERSIBLE LAYER : JPEG (SF=50/50)

IMAGE BLOCK WHERE THE NUMBER OF COLORS C IS SMALLER THAN ALLOCATION REFERENCE Th (CHARACTER IMAGE, CG IMAGE OR THE LIKE) IS ALLOCATED

IMAGE BLOCK WHERE THE NUMBER OF COLORS C IS EQUAL TO OR LARGER THAN ALLOCATION REFERENCE Th (NATURAL IMAGE OR THE LIKE) IS ALLOCATED

FIG. 4B

| ALLOCATION REFERENCE Th (NUMBER OF COLORS) | MAIN ALLOCATION DESTINATION | COMPRESSION RATIO | IMAGE QUALITY |
|---|---|---|---|
| HIGH | REVERSIBLE LAYER | LOW | HIGH |
| LOW | IRREVERSIBLE LAYER | HIGH | LOW |

FIG.6

APPLIED CODING PROCESSING
REVERSIBLE LAYER : PREDICTIVE CODING
IRREVERSIBLE LAYER : JPEG (SF=50/50)

METHOD AND APPARATUS FOR PROCESSING IMAGES IN A LAYERED STRUCTURE

CROSS-REFERENCE TO RELATED APPLICATION

This application claims priority under 35 USC 119 from Japanese Patent Application No. 2005-254408, the disclosure of which is incorporated by reference herein.

BACKGROUND

1. Technical Field

The present invention relates to, for example, an image processing apparatus and an image processing method for encoding input image data by applying plural coding processings.

2. Related Art

It is known, for example, that a compression method of performing ZIP compression when representation is possible with a predetermined or smaller number of colors as a result of color subtraction processing, while performing JEPG compression processing on an original image prior to the color subtraction processing when representation is impossible with the predetermined number of colors.

SUMMARY

According to an aspect of the present invention, there is provided an image processing apparatus including: an image element allocation unit that allocates image elements included in input image data to any of plural mutually-different coding processings, in accordance with a allocation reference; a coding unit that encodes, by the respective coding processings, the image elements allocated to the respective coding processings by the image element allocation unit; and a reference change unit that changes the allocation reference applied by the image element allocation unit.

BRIEF DESCRIPTION OF THE DRAWINGS

Embodiments of the present invention will be described in detail based on the following figures, wherein.

DETAILED DESCRIPTION

First, to assist understanding of the present embodiments, its background will be described.

A method for managing an image in a layer structure has been proposed. For example, in the MRC (Mixed Raster Content) method, image data is constructed with two image element layers to which multivalue image elements are allocated, and a selection layer to select an image element to be outputted by image area from these image element layers. Note that the image element layers and the selection layer are overlaid with each other thereby to construct one image, and a relative positional relation (overlay position or the like) is previously defined between plural layers.

In this manner, by managing an image as plural layers, a compression method or compression parameter can be applied in correspondence with the data characteristic (characteristic of tonality change or the like) of an image element included in each layer, and efficient compression processing can be performed. For example, reversible run-length compression, JBIG (Joint Bi-level Image Experts Group) compression or the like is performed on a selection layer or the like made with an image element where the number of gray levels is equal to or smaller than a predetermined value (for example, an image where the possible tonality is binary). Irreversible JPEG (Joint Photographic Coding Experts Group) compression is performed on an image element layer made with an image element where the number of gray levels is greater than the predetermined value (for example, an image where tonality changes in 256 gray levels). Since a selection layer or the like has an image where the number of gray levels is small, a sufficiently high compression ratio can be realized by reversible compression such as the run-length compression. Further, since an image element layer has a scan image or the like where the tonality shows a pseudo-continuous change, degradation of image quality is not obvious even by irreversible compression, and a high compression ratio can be realized.

Figure 1A:
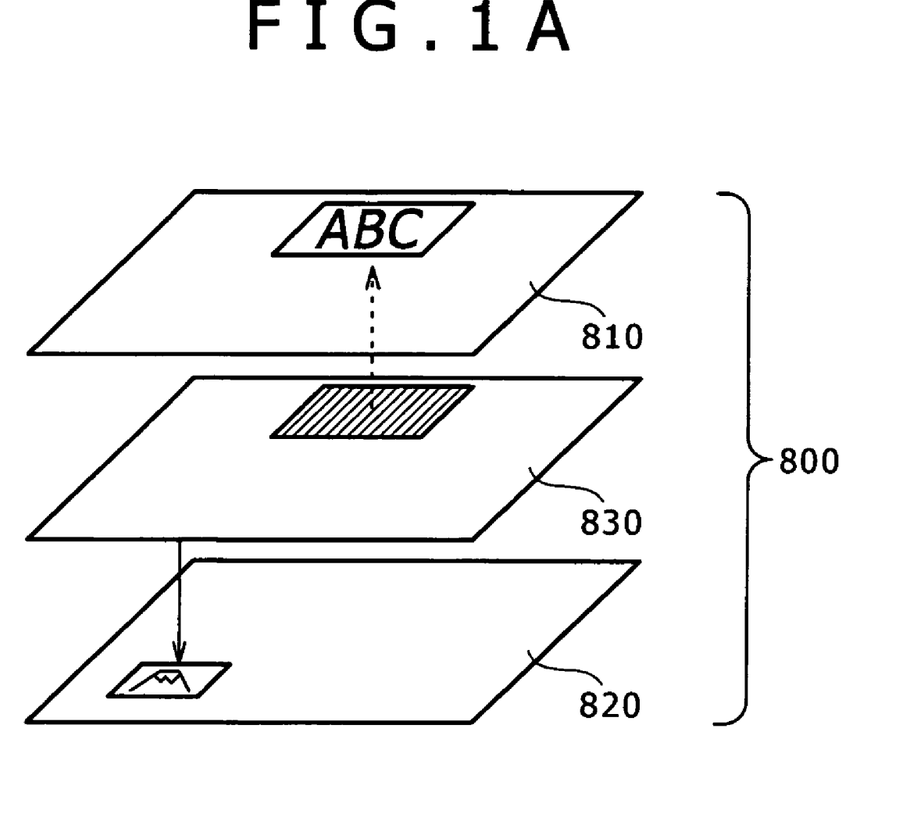
FIGS. 1A and 1B are explanatory views of an MRC layer structure.
Figure 1B:
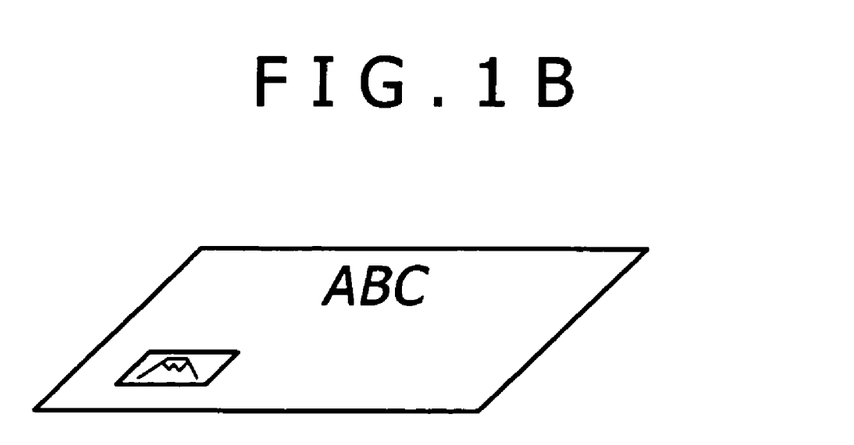

FIGS. 1A and 1B are explanatory views of an MRC layer structure.

As shown in FIG. 1A, MRC image data 800 has a first layer 810 and a second layer 820 as image element layers, and further has a selection layer 830 to select an image element from these layers.

A low-tonality image such as a simple CG image or a character image (in the present embodiment, a character image "ABC") is allocated to the first layer 810. Note that the first layer 810 has plural pieces of color information and halftone information included in the CG image or the character image.

A continuous tone image (photographic image or the like) having a number of gray levels (the number of colors) is larger than that of the first layer 810 is allocated to the second layer 820.

The selection layer 830 has binary data indicating an image element in the first layer 810 or the second layer 820 to be outputted by image area (for example, by pixel), forming a pattern image with the binary data. In the present embodiment, a hatched portion of the selection layer 830 is a pattern image to select the image element of the first layer 810, while a white portion is a pattern image to select the image element of the second layer 820.

When the image data 800 is outputted, an image element, selected in correspondence with the binary pattern included in the selection layer 830 from image elements included in the first layer 810 and the second layer 820, is displayed or printed, as an output image as shown in FIG. 1B.

The output image is obtained by combining the image element allocated to the first layer 810 and the image element allocated to the second layer 820.

When the image data having the above layer structure is generated, it is necessary to divide an input image into plural image elements in accordance with a predetermined reference (hereinbelow, referred to as an "allocation reference") and allocate the divided image elements to the respective layers in correspondence with respective data attributes (hereinbelow, the division of image element will be referred to as "segmentation"). For example, segmentation is performed based on an allocation reference such as an image characteristic (presence/absence of edge, the number of gray levels or the like), object (edge detection or the like) or density, and image elements cut out from the input image are allocated to the plural layers.

However, the above segmentation is performed based on a fixed allocation reference. That is, the segmentation is performed based on an allocation reference independent of a required compression ratio, image quality or the like.

As a result, in designing of the segmentation, it is necessary to estimate the required compression ratio, image quality or the like. Further, when an unexpectedly high compression ratio, image quality or the like is required, it is necessary to improve the compression ratio, image quality or the like in coding processing as the subsequent processing of the segmentation. On the other hand, even when the required compression ratio is low, segmentation fully utilizing the low compression ratio cannot be performed.

Further, in the segmentation, it is not always possible to accurately cut out an image element. There is a probability that erroneous determination of image element occurs. Such erroneous determination causes degradation of image quality.

For example, when a part of a natural image (image pixel to be allocated to the second layer 820) is allocated to the first layer 810 by erroneous determination, the image represented by continuous tonality may be filled with one color by color subtraction processing or the like. On the other hand, when a part of a CG image (image pixel to be allocated to the first layer 810) is allocated to the second layer 820, the image quality of a sharp edge portion included in the CG image may be degraded by JPEG compression or the like.

Accordingly, the image processing apparatus 2 according to the present embodiment enables changing of the allocation reference used in the segmentation.

More particularly, the image processing apparatus 2 changes the allocation reference used in the segmentation in correspondence with a required compression ratio or image quality, and divides input image data in accordance with the changed allocation reference, and allocates the divided image elements to any of plural coding processings. Note that the plural coding processings means plural coding processings expected to attain different compression ratios or image quality for the same image. For example, the plural coding processings include plural coding processings having mutually different coding methods, and plural coding processings having the same coding method but different coding parameters.

Note that in the above description, the segmentation is performed for generating the layer-structured image data, however, the segmentation is not limited to the above use. For example, the present invention is applicable to segmentation for hybrid compression where the coding processing is selected by image element.

Next, the construction of the image processing apparatus 2 according to the present embodiment will be described.

Figure 2:
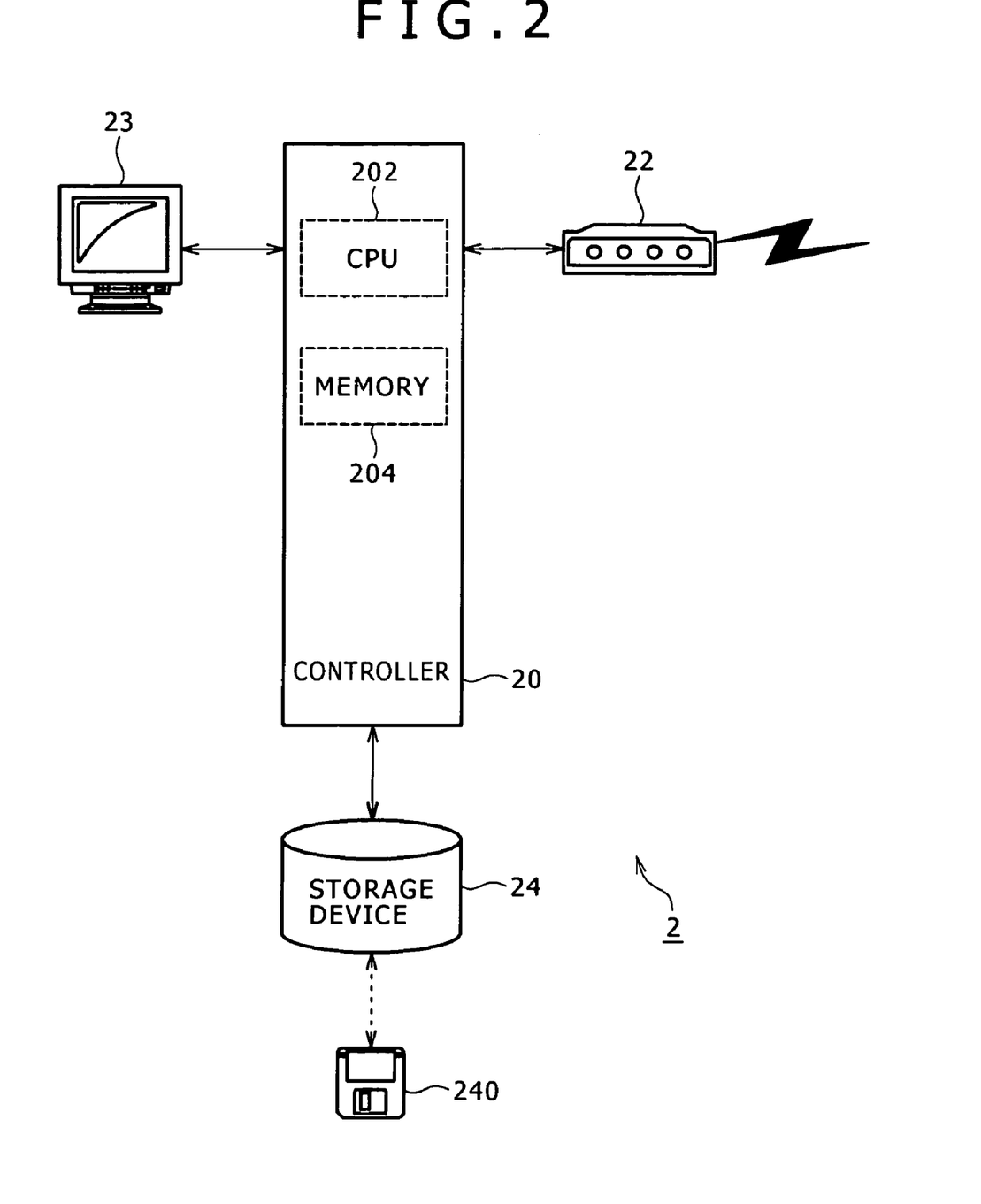
FIG. 2 is an explanatory view showing a hardware construction of an image processing apparatus 2 according to the present embodiment.

FIG. 2 is an explanatory view showing a hardware construction of the image processing apparatus 2 according to the present invention.

As shown in FIG. 2, the image processing apparatus 2 has a controller 20 including a CPU 202, a memory 204 and the like, a communication device 22, a user interface device (UI device) 23 including an LCD display or a CRT display, a keyboard, a touch panel and the like, a storage device 24 such as a HDD or a CDD unit, and the like.

For example, the image processing apparatus 2 is a general purpose computer, a printer or the like.

Figure 3:
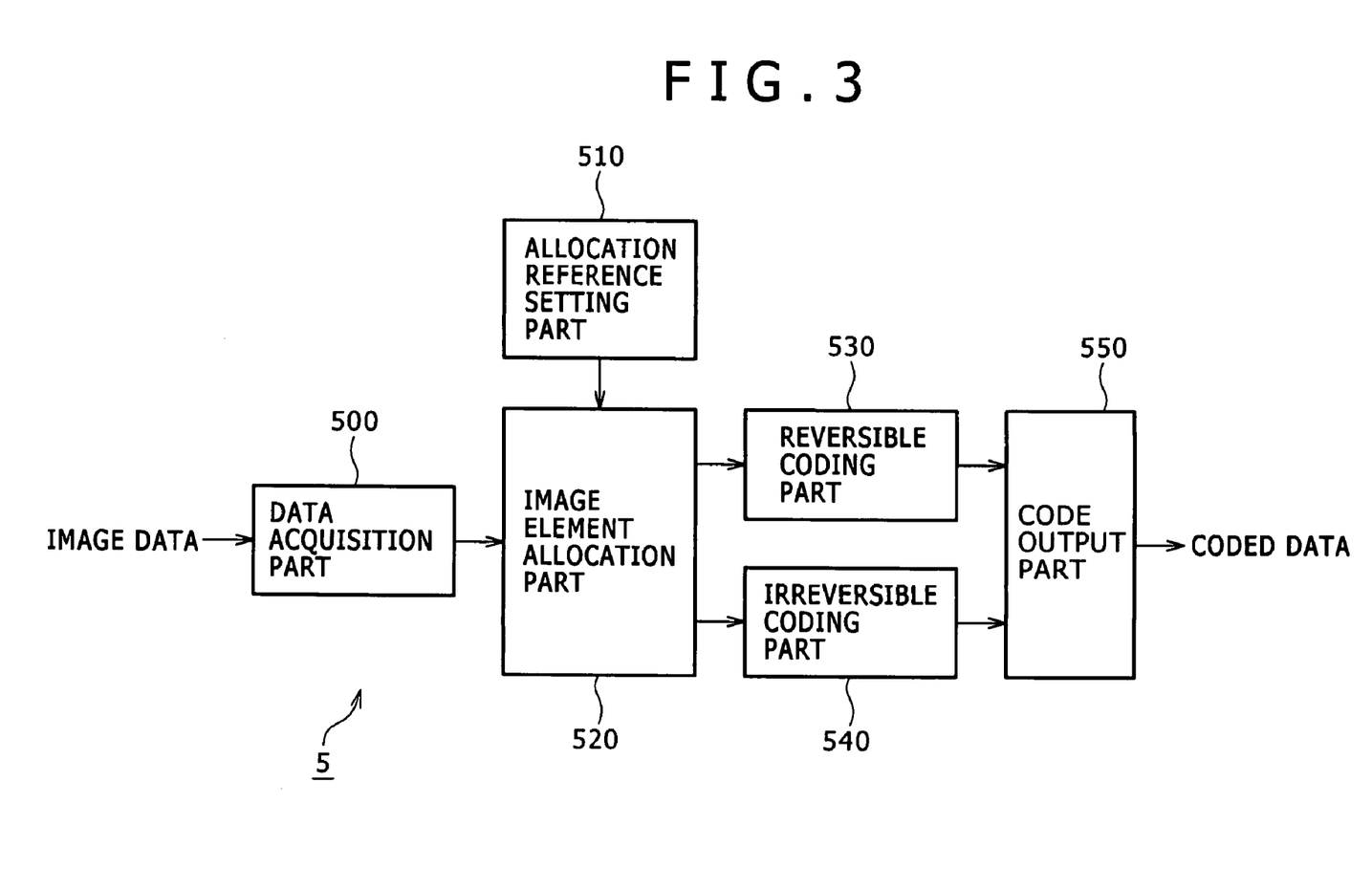
FIG. 3 is a block diagram showing a construction of an image processing program 5, executed by a controller 20 (FIG. 2), to realize an image processing method according to the present embodiment.

FIG. 3 is a block diagram showing a construction of an image processing program 5, executed by the controller 20 (FIG. 2), to realize an image processing method according to the present invention.

As shown in FIG. 3, the image processing program 5 has a data acquisition part 500, an allocation reference setting part 510, an image element allocation part 520, a reversible coding part 530, an irreversible coding part 540 and a code output part 550.

The image processing program 5 is supplied via e.g. a storage medium 240 (FIG. 2) or a network to the controller 20, then loaded to the memory 204, and is executed.

In the image processing program 5, the data acquisition part 500 obtains image data to be processed via the communication device 22 (FIG. 2) or the storage device 24.

The allocation reference setting part 510 changes an allocation reference used in the segmentation. The allocation reference means a reference to cut out image elements included in an input image and allocate the cut out image elements.

For example, the allocation reference setting part 510 changes the allocation reference in correspondence with a user's input, a required compression ratio (data size) or required image quality. More particularly, the allocation reference setting part 510 changes the allocation reference such that the higher the required compression ratio is, the wider the area of an image element allocated to higher compression ratio coding processing (or lower image quality coding processing) among plural coding processings, while the higher required image quality is, the wider the area of an image element allocated to lower compression ratio coding processing (or higher image quality coding processing) among the plural coding processings.

The allocation reference setting part 510 according to the present embodiment sets a threshold value Th of the number of colors included in a predetermined sized image block as the allocation reference, and outputs the set allocation reference Th (the number of colors) to the image element allocation part 520.

The image element allocation part 520 allocates image elements included in image data inputted from the data acquisition part 500 to any of the plural coding processings in accordance with the allocation reference changed by the allocation reference setting part 510.

For example, the image element allocation part 520 cuts out image elements from the image data and allocates the image elements to any of plural layers in accordance with the allocation reference.

The image element allocation part 520 according to the present embodiment allocates a predetermined sized image block cut out from the image data to a reversible layer 910 or an irreversible layer 920 to be described later, in accordance with the allocation reference Th (the number of colors) set by the allocation reference setting part 510. More specifically, the image element allocation part 520 divides the input image data into rectangular image blocks each having 8 pixels in a fast-scanning direction and 8 pixels in a slow-scanning direction, compares the number of colors included in each image block with the allocation reference Th (the number of colors) set by the allocation reference setting part 510. The image element allocation part 520 allocates the image block to the reversible layer 910 or the irreversible layer 920 in correspondence with the result of comparison. The image element allocation part 520 outputs an image block allocated to the reversible layer 910 to the reversible coding part 530, while it outputs an image block allocated to the irreversible layer 920 to the irreversible coding part 540.

Further, the image element allocation part 520 according to the present embodiment, generates a selection layer 930 to designate selection of the reversible layer 910 or the irreversible layer 920 by image area, based on the result of allocation to the reversible layer 910 and the irreversible layer 920, and outputs the generated selection layer 930 to the reversible coding part 530.

The reversible coding part 530 encodes the image element inputted from the image element allocation part 520 (that is, the image element allocated to reversible coding processing) with a reversible coding method, and outputs coded data to the code output part 550.

For example, the reversible coding part 530 employs a coding method (for example, a predictive coding method such as run-length coding or LZ coding) appropriate to an image with a smaller number of colors (the number of gray levels) (for example, a CG image or a character image) in comparison with an image processed by the irreversible coding part 540.

The reversible coding part 530 according to the present embodiment encodes the image element allocated to the reversible layer 910 using an image coding method (a method for applying plural prediction units) disclosed in Japanese Patent Application Laid-Open (JP-A) No. 2000-350215 (This Japanese Patent Application is hereby incorporated by reference in its entirety as though fully and completely se forth herein.).

Further, the reversible coding part 530 according to the present embodiment encodes the selection layer 930 inputted from the image element allocation part 520 with a reversible coding method, and outputs coded data of the selection layer 930 to the code output part 550.

The irreversible coding part 540 encodes the image element inputted from the image element allocation part 520 (that is, the image element allocated to irreversible coding processing) with an irreversible coding method, and outputs coded data to the code output part 550.

The irreversible coding part 540 according to the present embodiment encodes the image element allocated to the reversible layer 910 using the JPEG method.

Note that the combination of the reversible coding part 530 and the irreversible coding part 540 according to the present embodiment is an example of the coding unit according to the present invention, however, the coding unit is not limited to the combination of these parts. For example, the coding unit may include plural irreversible coding parts having different irreversibilities.

The code output part 550 outputs coded data of the reversible layer 910 and the selection layer 930 inputted from the reversible coding part 530 and coded data of the irreversible layer 920 inputted from the reversible coding part 530 to an external device (for example, the storage device 24 (FIG. 2).

Figure 4A:
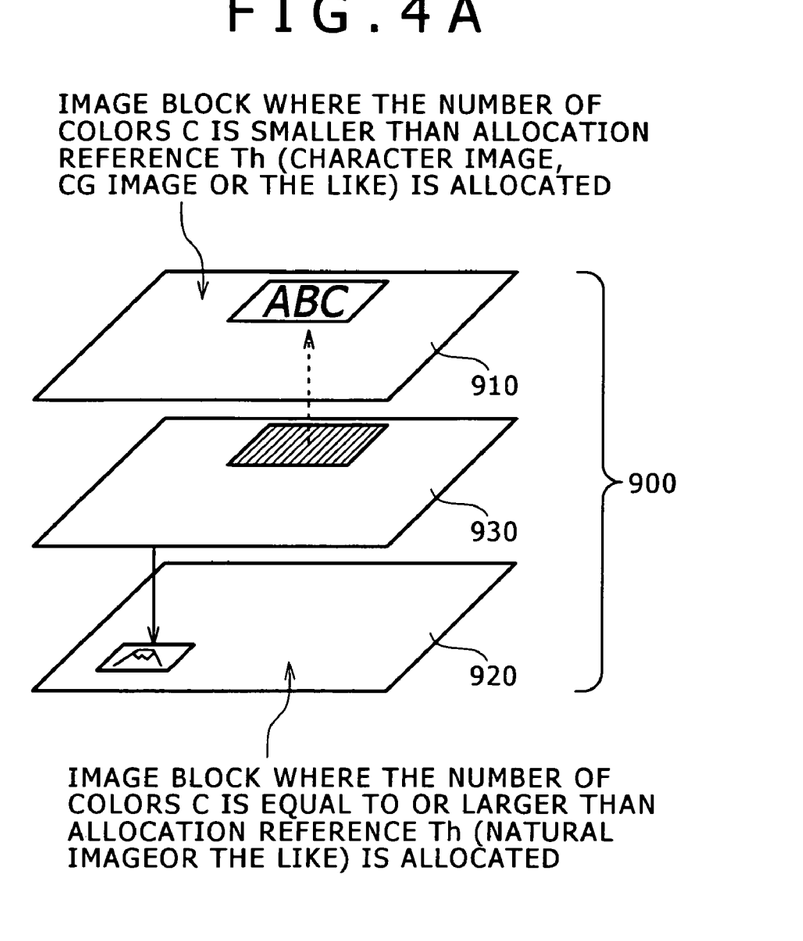
FIG. 4A is an explanatory view of segmentation by an image element allocation part 520.
Figure 4B:
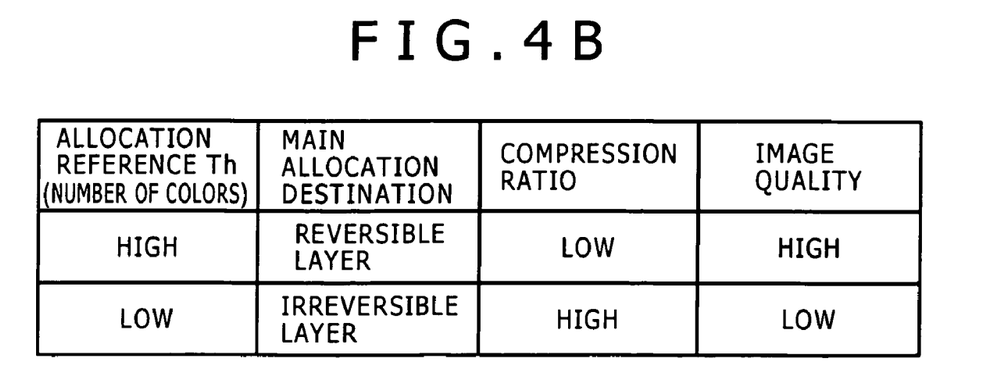
FIG. 4B is a table showing the relation between an allocation reference used in the segmentation and a compression ratio and image quality.

FIG. 4A is an explanatory view of the segmentation by the image element allocation part 520. FIG. 4B is a table showing the relation between the allocation reference used in the segmentation and the compression ratio and the image quality.

As shown in FIG. 4A, the image element allocation part 520 according to the present embodiment compares the number of colors C included in an image block with the allocation reference Th (threshold value of the number of colors). When the number of colors C is equal to or smaller than the allocation reference Th, the image element allocation part 520 allocates the image block (8×8 size) to the reversible layer 910. When the number of colors C is greater than the allocation reference Th, the image element allocation part 520 allocates the image block to the irreversible layer 920.

Accordingly, an image block where the number of colors is comparatively small (for example, a part of a character image or a CG image) is allocated to the reversible layer 910, while an image block where the number of colors is comparatively large (for example, a part of a natural image such as a photograph) is allocated to the irreversible layer 920.

Further, the selection layer 930 is generated based on the result of image block allocation.

The allocation reference Th is changed by the allocation reference setting part 510. When the allocation reference Th is high, the number of image blocks allocated to the reversible layer 910 is increased, while the number of image blocks allocated to the irreversible layer 920 is reduced, as shown in FIG. 4B. Accordingly, the compression ratio is lowered, however, high image quality coding processing is realized. Further, when the allocation reference Th is low, the number of image blocks allocated to the reversible layer 910 is reduced, while the number of image blocks allocated to the irreversible layer 920 is increased, as shown in FIG. 4B. Accordingly, a high compression ratio is realized.

Accordingly, the allocation reference setting part 510 according to the present embodiment sets the allocation reference Th to a higher value as the requirement for image quality is higher, while sets the allocation reference Th to a lower value as the requirement for the compression ratio is higher.

Next, the entire operation of the image processing apparatus 2 will be described.

Figure 5:
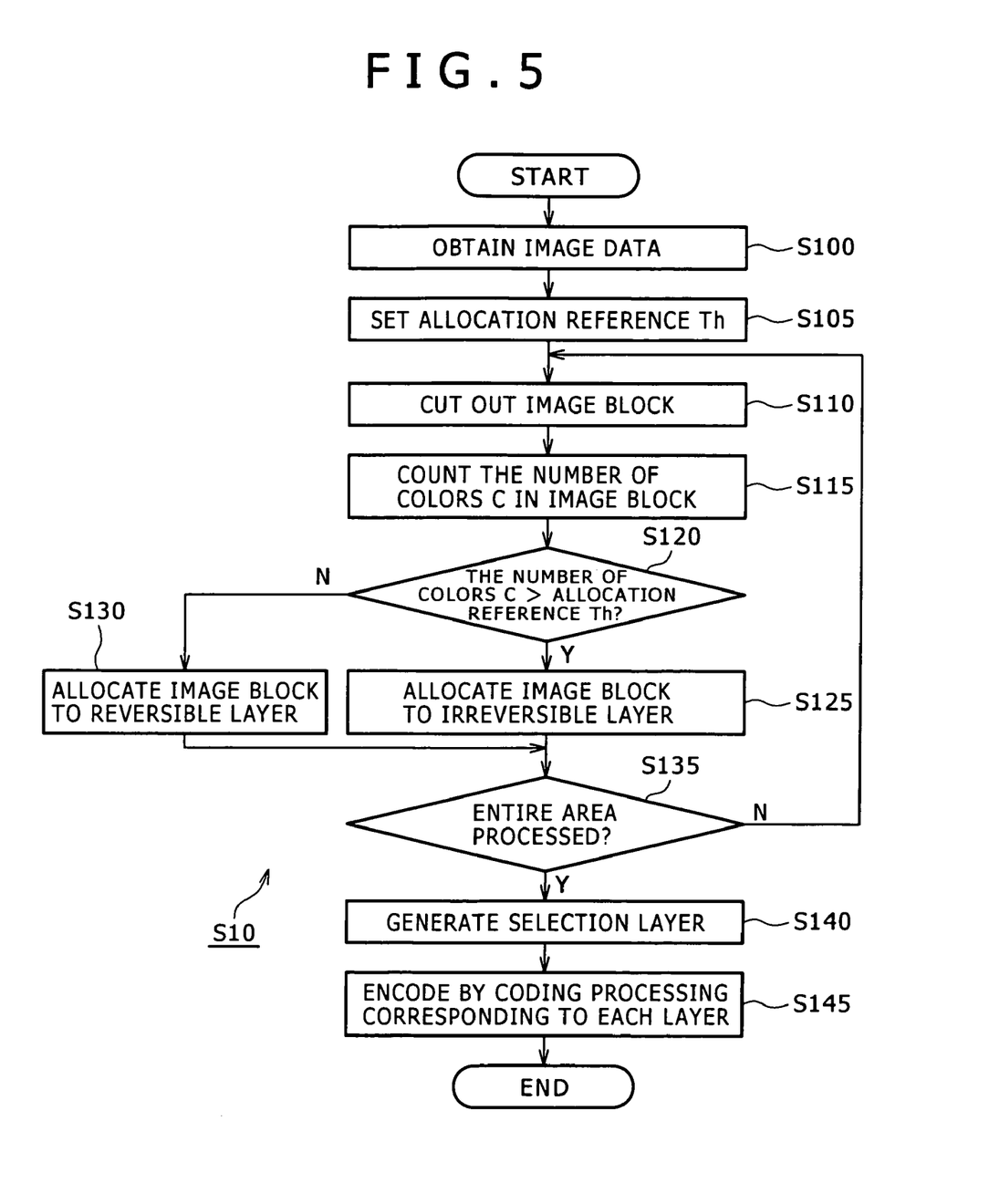
FIG. 5 is a flowchart showing an operation (S10) of the image processing apparatus 2 (image processing program 5)

FIG. 5 is a flowchart showing the operation (S10) of the image processing apparatus 2 (image processing program 5).

As shown in FIG. 5, at step 100 (S100), the data acquisition part 500 (FIG. 3) obtains image data to be processed via the communication device 22 (FIG. 2) or the storage device 24 (FIG. 2), and outputs the obtained image data to the image element allocation part 520.

At step 105 (S105), the allocation reference setting part 510 sets the allocation reference Th in correspondence with the user's input, and outputs the set allocation reference Th to the image element allocation part 520.

At step 110 (S110), the image element allocation part 520 (FIG. 3) cuts out an 8×8 sized image block in the scanning order from the input image data.

At step 115 (S115), the image element allocation part 520 counts the number of colors C included in the image block. The image element allocation part 520 according to the present embodiment performs determination on plural color components, and when the value of any of the color components is different, counts the component as a different color.

At step 120 (S120), the image element allocation part 520 compares the counted number of colors C with the allocation reference Th set by the allocation reference setting part 510. When the number of colors C is larger than the allocation reference Th, the process proceeds to processing at step S125, while when the number of colors C is equal to or smaller than the allocation reference Th, proceeds to processing at step S130.

At step 125 (S125), the image element allocation part 520 allocates the image block to the irreversible layer 920 (FIG. 4A).

That is, when the number of colors C included in the image block is larger than the threshold value Th, the image element allocation part 520 allocates the image block to the irreversible coding processing.

At step 130 (S130), the image element allocation part 520 allocates the image block to the reversible layer 910 (FIG. 4A).

That is, when the number of colors C included in the image block is equal to or smaller than the threshold value Th, the image element allocation part 520 allocates the image block to the reversible coding processing.

At step 135 (S135), the image element allocation part 520 determines whether or not the entire image has been allocated to any of the layers. When all the image blocks have been allocated to any of the layers, the process proceeds to processing at step S140, while when an unprocessed image block exists, the process returns to the processing at step S110, to cut out the next image block and perform the allocation processing.

The reversible layer 910 is inputted into the reversible coding part 530, while the irreversible layer 920 is inputted into the irreversible coding part 540.

At step 140 (S140), the image element allocation part 520 generates the selection layer 930 (FIG. 4A) based on the result of the allocation of the image blocks, and outputs the generated selection layer 930 to the reversible coding part 530.

At step 145 (S145), the reversible coding part 530 encodes the reversible layer 910 using the reversible coding method appropriate to coding of image data where the number of colors is small, and outputs coded data of the reversible layer 910 to the code output part 550.

Further, the reversible coding part 530 encodes the selection layer 930 using the reversible coding method, and outputs coded data of the selection layer 930 to the code output part 550.

The irreversible coding part 540 encodes the irreversible layer 920 using the irreversible coding method (JPEG method) appropriate to coding of image data where the number of colors is large, and outputs coded data of the irreversible layer 920 to the code output part 550.

The code output part 550 outputs the coded data of the reversible layer 910 and the selection layer 930 inputted from the reversible coding part 530 and the coded data of the irreversible layer 920 inputted from the irreversible coding part 540, as coded data of one piece of image data 900, to the communication device 22 (FIG. 2) or the storage device 24 (FIG. 2).

Figure 6:
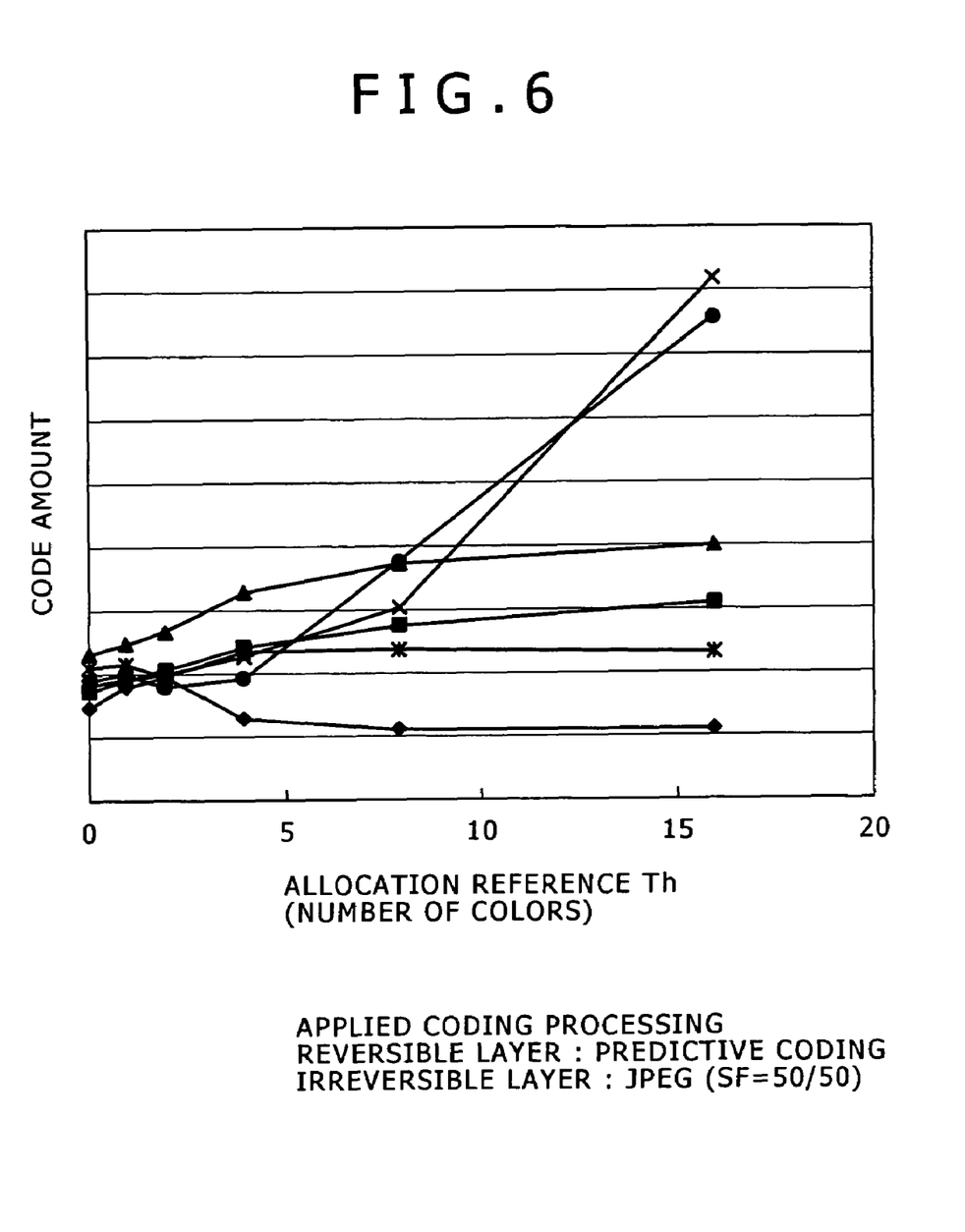
FIG. 6 is a graph showing code amounts obtained by encoding six image data pieces with various allocation references Th.

FIG. 6 is a graph showing code amounts obtained by encoding six image data pieces with various allocation references Th. Note that the graph shows code amounts when the reversible coding part 530 employs the image coding method disclosed in the Japanese Patent Application Laid-Open (JP-A) No. 2000-350215, and the irreversible coding part 540 employs the JPEG method (scaling factor SF=50/50).

As shown in FIG. 6, the code amount tends to increase in accordance with increase in the allocation reference Th (that is, the compression ratio is reduced). The higher the allocation reference Th becomes, the larger the number of image blocks allocated to the reversible layer becomes, and the contribution ratio of the reversible coding processing is increased.

As described above, since the image processing apparatus 2 according to the present embodiment performs segmentation in correspondence with a required compression ratio or image quality, coding processing to attain higher image quality and a higher compression ratio can be realized.

Next, a modification to the above embodiment will be described.

Figure 7:
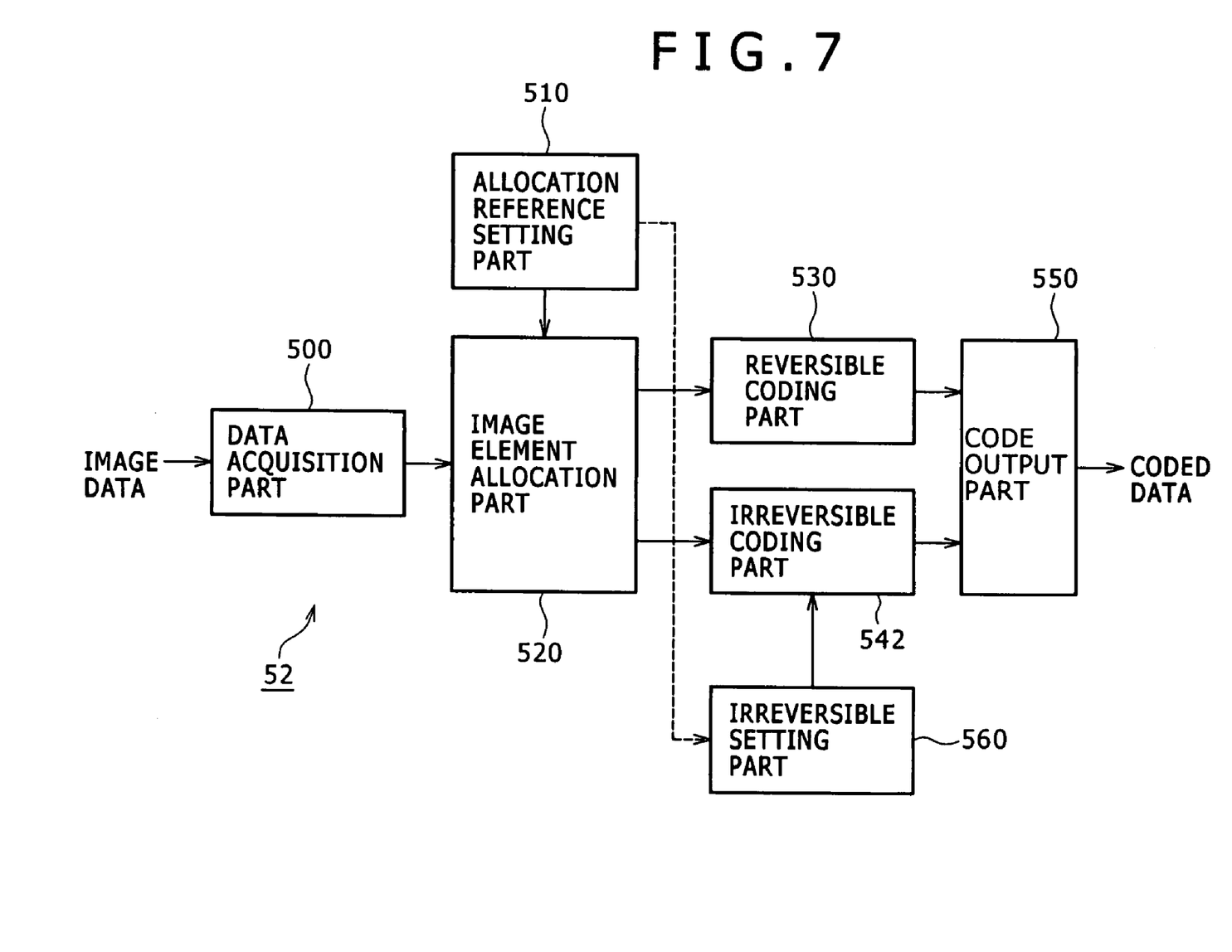
FIG. 7 is a block diagram showing a construction of a second image processing program 52.

FIG. 7 is a block diagram showing the construction of a second image processing program 52.

Note that among the respective constituent elements shown in the figure, the elements substantially the same as those shown in FIG. 3 have the same reference numerals.

As shown in FIG. 7, in the second image processing program 52, the irreversible coding part 540 of the first image processing program 5 (FIG. 3) is replaced with a second irreversible coding part 542, and an irreversible setting part 560 is added.

The irreversible setting part 560 changes an irreversible parameter to define the irreversibility of the irreversible coding processing, in cooperation with the allocation reference set by the allocation reference setting part 510. Note that the irreversible parameter means a parameter to control the degree of the irreversibility such as the scaling factor in the JEPG method.

For example, when the allocation reference setting part 510 has changed the allocation reference to realize a higher compression ratio, the irreversible setting part 560 changes the irreversible parameter to realize the higher compression ratio.

The second irreversible coding part 542 performs the irreversible coding processing in correspondence with the irreversible parameter set by the irreversible setting part 560.

Figure 8:
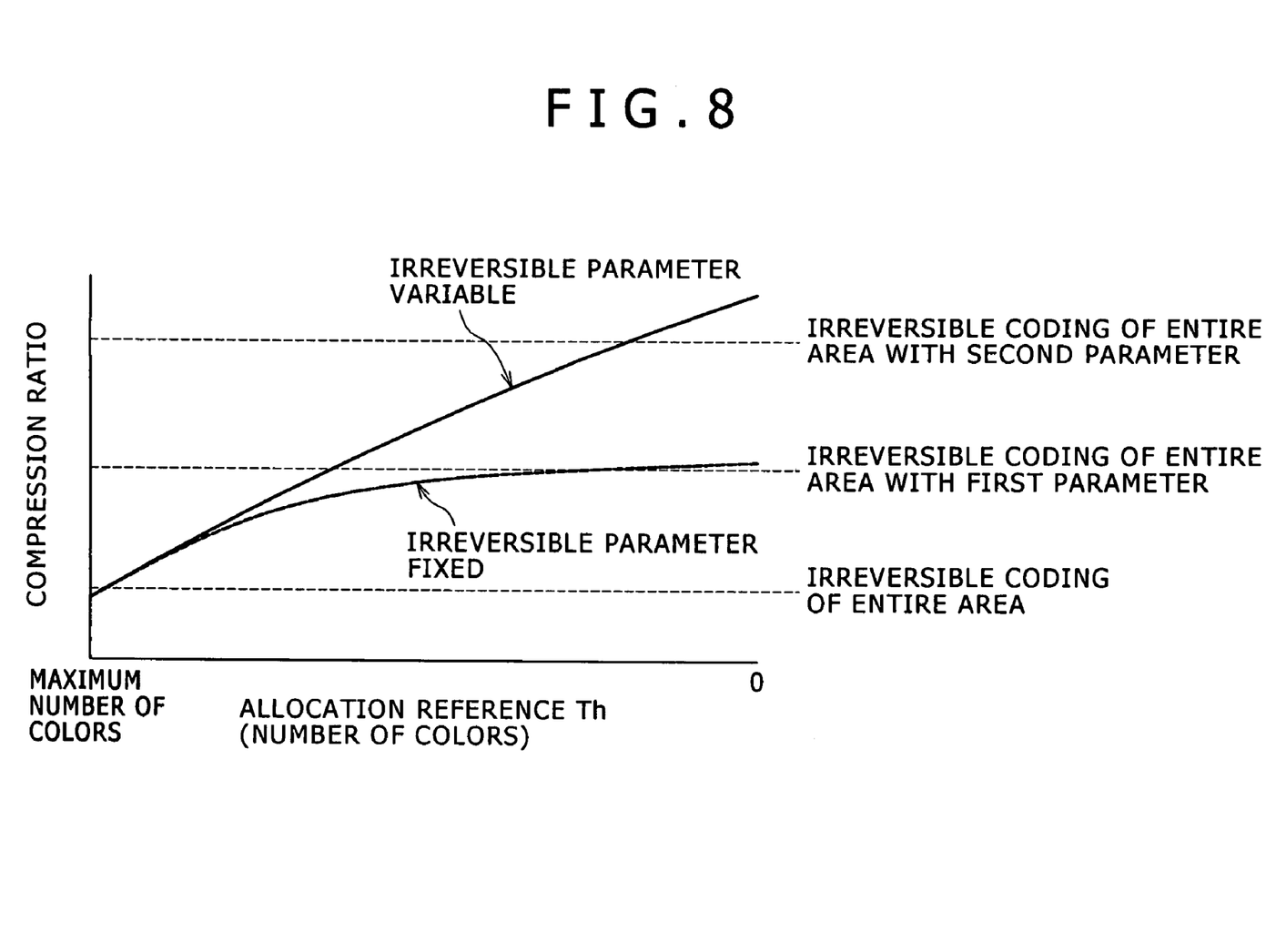
FIG. 8 is a graph showing a compression ratio upon application of a fixed irreversible parameter and a compression ratio upon application of a variable irreversible parameter.

FIG. 8 is a graph showing a compression ratio upon application of a fixed irreversible parameter and a compression ratio upon application of a variable irreversible parameter.

As shown in FIG. 8, when a fixed irreversible parameter is used, the upper limit of the compression ratio is determined by the value of the fixed irreversible parameter. That is, when the allocation reference Th becomes "0", all the image blocks are allocated to the irreversible layer and subjected to coding by irreversible coding processing. The compression ratio at this time becomes the upper limit. Note that the lower limit of the compression ratio is a compression ratio when the allocation reference Th is set to a maximum value and all the image blocks are allocated to the reversible layer.

Accordingly, the irreversible setting part 560 according to the present modification changes the irreversible parameter in correspondence with the value of the allocation reference Th, thereby raises the upper limit of an attainable compression ratio, to increase the range of a controllable compression ratio.

Further, in the above embodiment, the MRC method is applied, however, the present invention is not limited to this method. For example, image data may be constructed with two layers. Further, a hybrid compression method may be employed.

Figure 9A:
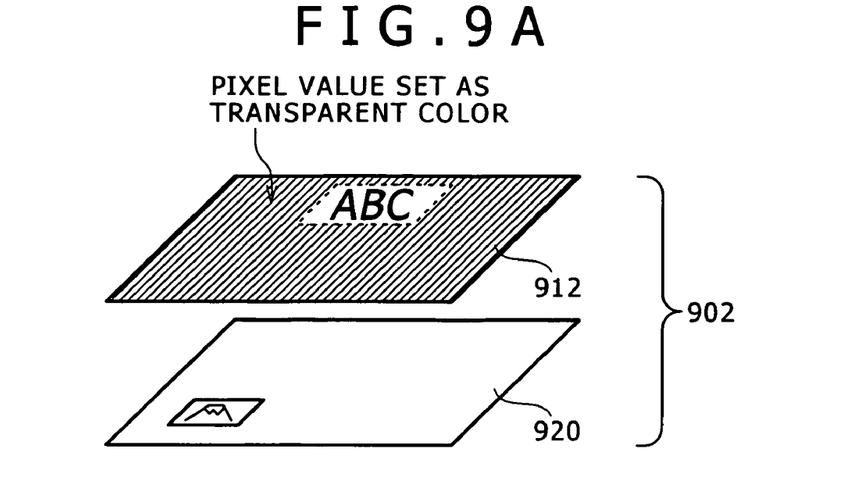
FIG. 9A is an explanatory view of multilayer image data 902 using a transparent color.
Figure 9B:
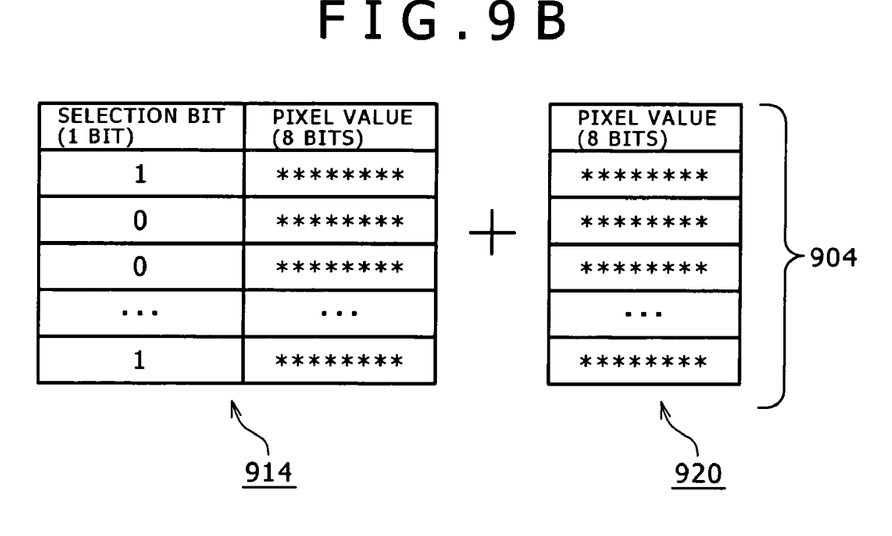
FIG. 9B is an explanatory view of image data 904 including a reversible layer where a selection layer selection layer is embedded.
Figure 9C:
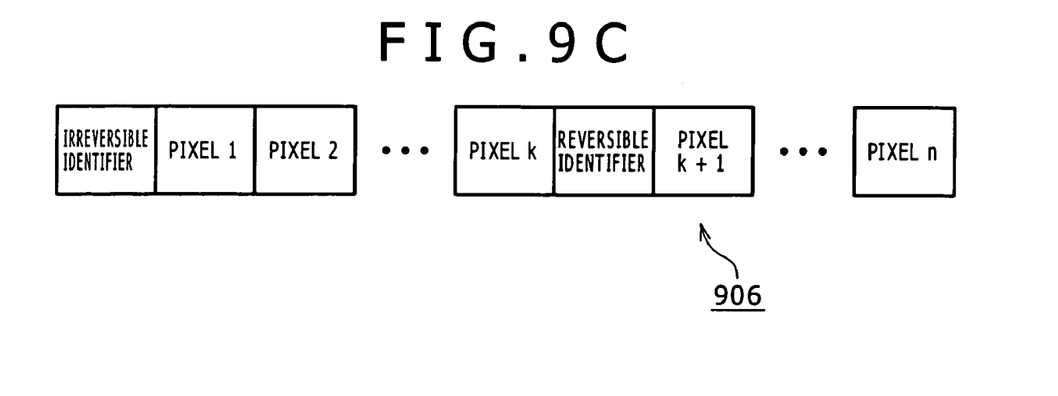
FIG. 9C is an explanatory view of image data 906 encoded by a hybrid compression method.

FIG. 9A is an explanatory view of multilayer image data 902 using a transparent color. FIG. 9B is an explanatory view of image data 904 including a reversible layer where a selection layer is embedded. FIG. 9C is an explanatory view of image data 906 encoded by a hybrid compression method.

As shown in FIG. 9A, it may be arranged such that the image element allocation part 520 allocates image elements to a second reversible layer 912 including a transparent-color area and the irreversible layer 920. In this case, an area of the reversible layer 912 where the image element is not allocated is filled with a pixel value set as a transparent color. That is, the image element allocation part 520 allocates the image elements included in an input image to the reversible layer 912 or the irreversible layer 920 in accordance with the allocation reference, and fills area(s) of the reversible layer 912 where no image element is allocated with a transparent color.

In this arrangement, the image data 902 constructed with two layers is generated.

Further, as shown in FIG. 9B, it may be arranged such that the image element allocation part 520 embeds selection information to be embedded in the selection layer 910 (information indicating the layer to be outputted) in the reversible layer 914, to generate image data 904 constructed with two layers. In the present modification, as the number of layers to which image elements are allocated is two, the selection information is represented with 1 bit ("1" indicates the reversible layer, while "0" indicates the irreversible layer). Accordingly, the image element allocation part 520 adds the 1-bit selection information (hereinbelow, referred to as a "selection bit") to the pixel value of each pixel included in the reversible layer 914. More particularly, among pixels included in the reversible layer 914, the image element allocation part 520 adds the selection bit "1" to a pixel in an area to which an image element is allocated, it while adds the selection bit "0" to a pixel in an area to which no image element is allocated.

Thus, the image data 904 is generated with the two layers.

Further, as shown in FIG. 9C, the image element allocation part 520 embeds identification information of coding processing to be applied in the image data. In this arrangement, plural coding processings are selectively applied to a single image data piece. Also in this case, the image element allocation part 520 selects coding processing to be applied by image element (for example, by image block) in accordance with the allocation reference. When image data is arrayed in the scanning order, the image element allocation part 520 inserts the identification information (irreversible identifier or reversible identifier) of the selected coding processing in the image data. The coding unit selects coding processing to be applied in accordance with the inserted identification information and performs coding.

In this manner, the allocation of coding processing is not necessarily performed in layer structure.

As described above, According to an aspect of the present invention, there is provided an image processing apparatus including: an image element allocation unit that allocates image elements included in input image data to any of plural mutually-different coding processings, in accordance with a allocation reference; a coding unit that encodes, by the respective coding processings, the image elements allocated to the respective coding processings by the image element allocation unit; and a reference change unit that changes the allocation reference applied by the image element allocation unit.

The image element allocation unit may allocate the image elements to plural layers, and the coding unit may encode the image elements allocated to the respective layers by the coding processings corresponding to the respective layers.

The reference change unit may change the allocation reference in correspondence with a required data size or image quality.

The plural layers may include a first layer to which first coding processing is applied and a second layer to which second coding processing to realize a compression ratio higher than that of the first coding processing is applied, and the reference change unit may change the allocation reference so as to increase an area of the image element allocated to the second layer as the required data size is smaller.

The plural layers may include a first layer to which a reversible coding method is applied and a second layer to which an irreversible coding method is applied, and the reference change unit may change the allocation reference so as to increase an area of the image element allocated to the first layer as the required image quality is higher.

The coding unit may encode the image data in correspondence with an irreversible parameter to control irreversibility when the irreversible coding method is applied, and the apparatus may further include an irreversible parameter change unit that changes the irreversible parameter in correspondence with the allocation reference changed by the reference change unit.

Further, one aspect of the present invention provides an image processing method including: changing an allocation reference used for allocation of image elements; allocating the image elements included in input image data to any of plural coding processings, in accordance with the changed allocation reference; and encoding the image elements allocated to the respective coding processings by the respective coding processings.

Further, one aspect of the present invention provides a storage medium readable by a computer, the storage medium storing a program of instructions executable by the computer to perform a function including: changing an allocation reference used for allocation of image elements; allocating the image elements included in input image data to any of plural coding processings, in accordance with the changed allocation reference; and encoding the image elements allocated to the respective coding processings by the respective coding processings.

According to the image processing apparatus of an aspect of the present invention, plural coding processings are appropriately combined, and image data is encoded at a desired compression ratio.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
  an image element allocation unit that allocates image elements included in input image data to a plurality of layers and to any of a plurality of mutually-different coding processings, in accordance with a allocation reference;
  a coding unit that encodes, by the respective coding processings, the image elements allocated to the respective coding processings by the image element allocation unit; and a reference change unit that changes the allocation reference applied by the image element allocation unit, wherein the plurality of layers include a first layer to which a first coding processing is applied and a second layer to which a second coding processing is applied, the second coding processing realizing a compression ratio higher than that of the first coding processing.

2. The image processing apparatus according to claim 1, wherein the coding unit encodes the image elements allocated to the respective layers by the coding processings corresponding to the respective layers.

3. The image processing apparatus according to claim 2, wherein the reference change unit changes the allocation reference in correspondence with a required data size or image quality.

4. The image processing apparatus according to claim 3, wherein the plurality of layers include a first layer to which first coding processing is applied and a second layer to which second coding processing to realize a compression ratio higher than that of the first coding processing is applied, and the reference change unit changes the allocation reference so as to increase an area of the image element allocated to the second layer as the required data size is smaller.

5. The image processing apparatus according to claim 3, wherein the plurality of layers include a first layer to which a reversible coding method is applied and a second layer to which an irreversible coding method is applied, and the reference change unit changes the allocation reference so as to increase an area of the image element allocated to the first layer as the required image quality is higher.

6. The image processing apparatus according to claim 5, wherein the coding unit encodes the image data in correspondence with an irreversible parameter to control irreversibility when the irreversible coding method is applied, and the apparatus further comprises an irreversible parameter change unit that changes the irreversible parameter in correspondence with the allocation reference changed by the reference change unit.

7. The image processing apparatus according to claim 1, wherein the allocation reference includes at least one of an image characteristic, an object and density.

8. The image processing apparatus according to claim 1, wherein the allocation reference includes at least one of a number of colors and a number of gray levels.

9. The image processing apparatus according to claim 1, wherein the image element allocation unit allocates the image elements by embedding identification information in the image data, the identification information corresponding to each of the coding processings for the image elements.

10. The image processing apparatus according to claim 1, wherein the coding unit includes a reversible coding part and an irreversible coding part, the reversible coding part that encodes the image elements with a reversible coding method codes, the irreversible coding part that encodes the image elements with a irreversible coding method.

11. The image processing apparatus according to claim 1, wherein the coding unit includes a plurality of reversible coding parts that encodes the image elements with a irreversible coding method, each of the reversible coding parts having different irreversibilities.

12. A computer-implemented image processing method comprising:

using a processor to perform the steps of:

changing an allocation reference used for allocation of image elements;

allocating the image elements included in input image data to a plurality of layers and to any of a plurality of coding processings, in accordance with the changed allocation reference; and encoding the image elements allocated to the respective coding processings by the respective coding processings, wherein the plurality of layers include a first layer to which a first coding processing is applied and a second layer to which a second coding processing is applied, the second coding processing realizing a compression ratio higher than that of the first coding processing.

13. A storage medium readable by a computer, the storage medium storing a program of instructions executable by the computer to perform a function for image processing, the function comprising:

changing an allocation reference used for allocation of image elements;

allocating the image elements included in input image data to a plurality of layers and to any of a plurality of coding processings, in accordance with the changed allocation reference; and encoding the image elements allocated to the respective coding processings by the respective coding processings, wherein the plurality of layers include a first layer to which a first coding processing is applied and a second layer to which a second coding processing is applied, the second coding processing realizing a compression ratio higher than that of the first coding processing.

* * * * *